(12) United States Patent
Ehrensvard

(10) Patent No.: US 8,789,146 B2
(45) Date of Patent: *Jul. 22, 2014

(54) DUAL INTERFACE DEVICE FOR ACCESS CONTROL AND A METHOD THEREFOR

(75) Inventor: Jakob Ehrensvard, Taby (SE)

(73) Assignee: Yubico Inc., Palo Alto, CA (US)

( * ) Notice: Subject to any disclaimer, the term of this patent is extended or adjusted under 35 U.S.C. 154(b) by 156 days.

This patent is subject to a terminal disclaimer.

(21) Appl. No.: 13/447,536

(22) Filed: Apr. 16, 2012

(65) Prior Publication Data

US 2012/0265988 A1    Oct. 18, 2012

Related U.S. Application Data

(60) Provisional application No. 61/475,587, filed on Apr. 14, 2011.

(51) Int. Cl.
*H04L 29/06* (2006.01)
*H04W 12/06* (2009.01)

(52) U.S. Cl.
CPC .................................. *H04W 12/06* (2013.01)
USPC ........................... 726/4; 713/172; 380/227

(58) Field of Classification Search
CPC ....................................................... H04W 12/06
USPC .......................................................... 726/4
See application file for complete search history.

(56) References Cited

U.S. PATENT DOCUMENTS

| | | | |
|---|---|---|---|
| 2005/0109841 A1* | 5/2005 | Ryan et al. | ................. 235/380 |
| 2006/0208066 A1 | 9/2006 | Finn et al. | |
| 2010/0093334 A1 | 4/2010 | Bertin et al. | |
| 2010/0191951 A1 | 7/2010 | Malone et al. | |

FOREIGN PATENT DOCUMENTS

| | | |
|---|---|---|
| EP | 1783660 A2 | 5/2007 |
| EP | 2063400 A1 | 5/2009 |
| FR | 2938094 A1 | 5/2010 |

OTHER PUBLICATIONS

International Search Report and Written Opinion issued Jul. 17, 2012 in counterpart Application No. PCT/EP2010/056881.

* cited by examiner

*Primary Examiner* — Pramila Parthasarathy
(74) *Attorney, Agent, or Firm* — Fenwick & West LLP

(57) ABSTRACT

The invention provides a low-cost access control device for identification and authentication in both the "digital" and "physical" worlds by contact-bound respectively contact-less interfaces and where individual users of the device can securely update access control credentials and cryptographic keys from a remote system without the need for any additional hardware or specialized software. The access control credentials and the at least one cryptographic key shall be readable by an access control system via the contact-less interface of the device, thereby enabling or denying the holder of the device access.

13 Claims, 1 Drawing Sheet

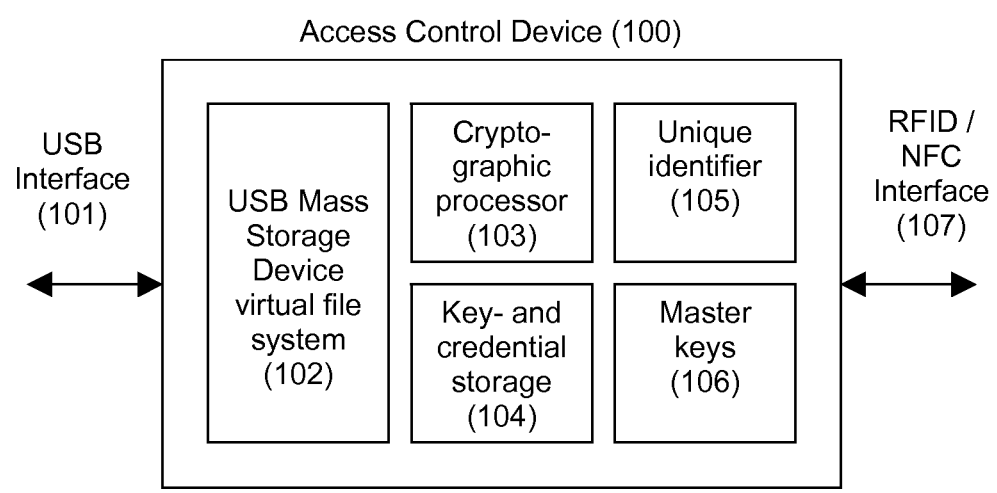

US 8,789,146 B2

DUAL INTERFACE DEVICE FOR ACCESS CONTROL AND A METHOD THEREFOR

CROSS-REFERENCE TO RELATED APPLICATIONS

This application claims priority under 35 U.S.C. §119(e) to U.S. Provisional Application No(s). 61/475,587 filed on Apr. 14, 2011, the entire contents of which are hereby incorporated by reference.

FIELD OF THE INVENTION

The present invention relates to a device, emulating a USB Mass Storage Device, having dual interfaces for contact-bound respectively contact-less communication. The device and method can be used for off-line access control.

BACKGROUND OF THE INVENTION

Access control in its broader context can be seen divided into "physical" access control, which typically means access control to buildings and premises and "logical" or "digital" access control which means remote access to services via computer networks. As these functions have traditionally been divided between different departments in an organization, this division can be seen as practical. However, as the importance of "digital" identities increase, a convergence between "physical" and "digital" identities is expected over time.

Over the years, there has been a shift towards contact-less identification systems in favor of traditional magnetic stripe cards. Apart from the convenience factor of not having to physically swipe or insert a card in a slot, contact-less readers can be made sealed and are therefore less susceptible to mechanical degradation and vandalism. Furthermore, the newer generations of contact-less readers include features of challenge-response mechanisms to prevent counterfeiting and eavesdropping, thereby enhancing the overall access security.

Access control systems can either be made as "on line" or "off line", where the on-line system stays in network contact with a centralized system. Individual identities can then instantly be granted and revoked via the host system. Generally, it can be said that these systems have an intelligent back-end system whereas the cards themselves only keep the identity. Off-line systems on the other hand are as the name suggests not directly connected to the host system. The rules for access is then rather stored in the access card rather than the back-end. The off-line system therefore typically requires re-configuration of the access card to change individual card's access rights.

A benefit of the off-line approach is that access terminals can work independently of a host system and no wiring is necessary, thereby greatly simplifying installation with associated benefits of cost savings. On the other hand, all changes to access credentials for individual users require re-configuration of that user's particular card, which in hand typically requires the user having to go to a centralized location to have his or her card re-configured. Therefore, in certain settings a hybrid system of on-line and off-line is formed to allow individual access cards to be re-configured at certain points when the access credentials have been changed. By integration of physical- and digital access credentials, the access control token can then be automatically updated with the most recent rules every time the user uses the token to log on to the computer network.

In some settings, the administrative overhead of maintaining off-line systems make them less practical to implement and the obstacle for the users can be significant.

It is known to combine a USB key with and a RFID reader. In for example WO2007023473 is described a USB key having an integrated RFID reader in order to be able to use the general capability of the USB key to be connected to any computer or smart-phone having a USB port for on-line identification of a user. Data can be transferred between the RFID reader, an RFID tag and the computer. A user can identify himself with the RFID tag via the RFID reader on the USB key and thereby gain automatic access to a pre-configured site on the computer.

US20080192933 describes a dual interface portable device for use in on-line transactions in conjunction with a remote server over a network. The device comprises a first means for secure communication in the form of a USB key connectable to a USB port of a computer and a second means for communication in the form of a card reader for reading a bank card. When used the bank card is presented to the portable device card reader. The number of the bank card is encrypted in the portable device and transferred to the server and the transaction is eventually confirmed by the server.

JP2009187502 describes a system for ticket reservation and issuing comprising an RFID chip built-in USB compact device. The device is pre-programmed to reach a target web site when inserted into a computer. When a ticket is reserved and purchased, information is written into the RFID chip of the USB key. The ticked can then be used off-line at a RFID reader identifying the ticket.

WO 2005050384 describes a multi-interface USB modular token which can be plugged into a PC and connected to internet. A portion of the modular token can be removed and used off-line via a wireless interface in the real world.

US2006279413 describes a dual-interface device allowing a host system to issue instructions to a RFID module via a Secure Digital Input/Output (SDIO) interface of the device to scan nearby RFID tags and convey the stored content of the scanned RFID tag back to the host device. The host device may also instruct the RFID module, via the SDIO interface to write specific data to the memory of the RFID tag.

US 20050182971 describes a security device for computer systems. The device stores information relating to user authentication, for performing computations and cryptographic operations for generating a one-time pass code either on-line or off-line. The generated one-time pass code is displayed on a screen on the device for a pre-determined period of time.

A problem with the prior art concerns management and distribution of cryptographic keys, where access control tokens generally cannot be securely updated "in the field" after initial cryptographic information has been initialized in a secure facility. In the access control environment, a user is typically required to go to a centralized facility to have the access control token updated with specialized equipment, using specialized software with online connection to a database, all performed in a secure environment.

DESCRIPTION OF THE INVENTION

An object of the present invention is to provide a low-cost access control device and a method for identification and authentication in both the "digital" and "physical" worlds by contact-bound respectively contact-less interfaces and where individual users of the device can securely update access control credentials and cryptographic keys from a remote system without the need for any additional hardware or specialized software. The access control credentials and the at least one cryptographic key shall be readable by an access control system via the contact-less interface of the device, thereby enabling or denying the holder of the device access.

The remote system for remote update service can include a host computer having a suitable port for receiving the contact-bound interface of the access control device and connected to a central server via for example Internet.

The solutions to the problems described are defined by claim 1 and claim 10.

In order to manage the secure update an appropriate security model must be implemented to allow individuals to identify themselves prior to changing the access device's access control credentials and cryptographic keys as well as providing for that information sent to the device over an insecure channel, such as Internet is cryptographic protected.

The present invention describes a scheme where access control credentials and cryptographic keys are distributed as encrypted and digitally signed files, tied to a specific access control device comprising an access control processor. Instead of requiring special token read/write equipment on a remote station, the access control device features a contact-bound interface USB interface, allowing it to be directly used with most computers. Furthermore, instead of requiring specialized software to update the access control device, the device presents itself as a USB Mass Storage Device virtual file system, enabling access control credentials and cryptographic keys to be added and removed in a simple and secure way provided the files are accepted by pre-configured identification data. The access control credentials and cryptographic key are used for communication over the contact-less interface with an access control system, for example a RFID reader.

The access control device includes the following features:

The access control device comprises pre-configured identification data including a pre-configured identity and a cryptographic key to allow identification and authentication when connected to a remote system. Protocols like for example a One-Time-Password (OTP), a challenge-response or other mutual authentication protocols can be used.

The access control device includes a USB connection to a host computer port to allow update of cryptographic keys and access credential credentials via a configuration Application Programming Interface (API) featuring an end-to-end security model that allows remote update via a remote system.

Identification and authentication via a contact-less interface.

By updating the access control device, users can get schedules and credentials sent out regularly and access keys can be changed to minimize the risk of keys being compromised. Furthermore, lost keys and revoked keys in the off-line systems that are not accounted for are automatically revoked on a regular basis.

In summary, the present invention describes a low-cost access control device and method concept for both the physical and digital worlds that allows the user itself to update its access credentials and cryptographic keys using an ordinary PC without the need for any additional hardware. The setting makes off-line access control systems more flexible and comparable to on-line systems.

According to the invention it is desired to unify the aspects of physical- and digital identification and authentication, ultimately allowing one access control device to be used seamlessly in both environments. Such a device would have the following benefits:

A unified credential scheme means that for example each employee is having an access control device with his unique credentials.

Credentials can be role-based and follow a corporate-wide catalog service, such as LDAP or Active Directory.

By combining physical and digital access in one single access control device, a security behavior is fostered as the user needs to bring the device when leaving the workplace, thereby increasing the overall security.

Simple to deploy. The present invention is realized by a device including a contact-less identification interface and an USB identification interface where both subsystems are interconnected and integrated into a single access control device.

Furthermore, given the considerable cost for contact-less card programming devices, it is an advantage to be able to update an access control device which is including the function of a contact-less card without having to deploy programming devices to a large number of users.

The term "physical" is by no means limited to traditional access control applications, where access to doors is the main objective. With the expansion of Near Field Communication (NFC) infrastructure, the present invention would fit particularly well in for example payment-, mass-transit- and other ticketing applications.

The term contact-bound could also include a wireless connection have the same properties as a USB connection.

BRIEF DESCRIPTION OF THE DRAWINGS

FIG. 1 shows a schematic view of an access control device according to the invention.

DETAILED DESCRIPTION OF THE INVENTION

With reference to FIG. 1, the access control device (100) has preferably the embodiment of a well-known small portable USB memory stick, featuring a USB interface (101) with a USB type A plug which allows it to be connected to a host computer via a standard USB type "A" receptacle and a RFID/NFC contact-less interface (107) conformant to at least one Radio Frequency Identification (RFID) standard, such as ISO14443 and/or the Near Field Communication (NFC) ecosystem and with an integrated coil antenna (not shown).

When inserted into a USB port of a host computer (not shown) the access control device (100) presents a USB Mass Storage Device virtual file system (102) to the host computer. By denoting it "virtual" means that it does not expose free read- and write access to a memory array like a conventional USB memory, but a virtual representation of the information present in the key- and credential store (104). Each entry of a cryptographic key and access credentials in the store is represented as a file in the virtual file system.

If the remote system attempts to write a file to the virtual file system (102), the cryptographic processor (103) uses one or more master keys from a secure storage (106) and a unique device identifier (105) to decrypt this file and then verify a digital signature that must be present last in the file to be downloaded. Several well-known key wrapping protocols exists, but in this example a single master key is used to verify the file secured by the AES-CCM encryption/signature scheme. If this decryption/verification passes, the decrypted information is passed over to the key- and credential store (104).

When the access control device (100) is detached from the USB port of the host computer, the device can be used in conjunction with an access control system (not shown). The device is then interrogated by a RFID/NFC reader (not shown) via the RFID/NFC interface (107). The access credentials with associated cryptographic keys in the storage (104) are then used for the cryptographic operations involved in the access control transaction.

Conversely, the remote system can also read access control credentials and keys through the USB interface (101) via the virtual file system (102). The cryptographic processor (103) then uses the unique identifier (105) and one or more master keys (106) to wrap data in the key- and credential store (104) before transferring the data over to the remote system.

This simple, yet robust scheme allows simple management of access control credentials and cryptographic keys, in a manner equivalent to music files on a MP3 player. It can be assumed that the widespread use of such devices makes it conceptually easy for users to add, remove and make backup copies of access credentials and cryptographic keys, using normal file management tools.

EXAMPLES

Example 1

Update of Credentials by the Means of an USB MSD Device

By providing an access control device having an USB Mass-Storage Device (MSD) interface, the device can present itself to a host computer as a generic USB memory stick. Cryptographic information can then be added, revoked and be backed up using the operating system's standard functionality for file handling.

The device provides a MSD device with a virtual file system, accepting wrapped and/or Authenticated Encryption with Associated Data (AEAD) files only. A binary file copied to the device will then be decrypted and verified by the pre-configured identity data of the device. If the MAC or signature does not match, the file is rejected. If it matches, the decrypted data is stored in internal non-volatile memory (104). Conversely, information created by the device can be encrypted and wrapped in the same manner, thereby allowing files to be exchanged transparently. It is then a matter for the entity receiving the files to verify its AEAD to determine if it they are authentic.

A benefit of this scheme is to have a familiar way of handling information, which is supported natively in the operating system in most systems today. Water-marked pieces of information targeted for a single recipient only can then be handled as files.

In another embodiment of an access control device, the device does not by default expose the USB MSD virtual file system when plugged into the USB port, but rather just exposes USB HID functions. By pressing and holding an activation switch on the device for a specific time, the device resets itself and then installs as a USB MSD virtual file system. Once the intended operations have been completed and the device is removed, the written data is committed to storage (104) and is ready to be used in subsequent operations. The device will then reset after a pre-programmed timeout and re-install itself as a USB HID device.

In another embodiment, the access control device may comprise a USB composite device, featuring both a USB HID and USB MSD functionality.

In yet another embodiment, the access control device includes the MSD virtual file system as a removable media, such as a memory card reader. The device then becomes visible in the file system as a reader without a card inserted into it. When the device holder presses the activation switch, a "media inserted" signal is sent to the host computer, thereby causing the file system to be mounted and visible to the remote system.

Example 2

One-way One-Time-Password (OTP) Generator Via USB

For access to basic services where user identification and authentication is needed, the control access device can act as OTP generator. The OTP generator can transfer OTP by mimicking an USB keyboard, thereby allowing OTPs to be received by any host application without the need for any drivers- or other communication proxies. The device can have an optional button to trigger generation and transmission of an OTP, without explicit intervention or synchronization with a host application other than the host application being able to receive a number of emulated keystrokes. The OTP generator may also provide a programmatic interface to explicitly generate an OTP by command of a host application.

Example 3

Authentication Device for Computer Services Via USB

When an access control device is attached to a host computer via the USB port, the device can act as an identification- and authentication device in a transaction process over a computer network. An application program can access the device via an Application Programming Interface (API) that allows the unique identification number of the device to be read. Via the API, further functionality for challenge-response or mutual authentication can be accessed. By the means of an integral cryptographic processor (103) and cryptographic key store (106), authentication can be performed via a range of well-known methods and protocols. The basic steps are as follows:

1. Request the device identity via the API
2. Send a challenge to the device
3. The device performs a cryptographic operation on the challenge and the device identity
4. The response is sent back via the API
5. The host application can then decode the response to verify if the claimed identity is authentic.

Several more advanced protocols exist, such as the mutual authentication scheme described in the ISO/IEC 9798 standards framework.

When attached to a host computer, the device can identify itself as a Human Interface Device (HID) to allow simple interaction in most computer environments without the need of additional low-level drivers.

Example 4

Contact-less RFID Access Control Functionality

With the means of an integrated RFID coil antenna, the access control device supports one or more RFID standards, such as ISO14443. By implementing a mutual authentication protocol, such as the NXP MIFARE standard, the device can co-exist with legacy tokens and access control cards in existing installations. The RFID functionality allows the device to be used in a Near Field Communication (NFC) infrastructure.

Example 5

NFC NDEF "Smart Poster" Contact-less Identification and Authentication

This function implements method to create and convey a One Time Password (OTP) scheme which can be converted and formatted in such a way that it can be read as a static string via NFC, where that string is being unique at each time of invocation. These OTP strings can then be used to automatically invoke for example a web browser in a mobile device and automatically perform user identification and authentication.

Steps involved:
1. The OTP generating device is inserted into the RF field
2. A new OTP code is generated as described in function 1 above.
3. The OTP code is formatted into a static NDEF message
4. The RFID/NFC device responds to interrogation requests generated by the reader.

The RFID/NFC reader reads the OTP formatted in step 3 as if it was a static message, using standardized methods as defined by the NFC NDEF specification.

Assume the following example, where the access control device holds a pre-configured static data entry and is capable of generating OTPs, such as OATH-HOTP as defined by RFC 4226.

Static data: http://www.acme.com/?id=4711&otp=
OTP generated: 02347102
Static data presented http://www.acme.com/?id=4711&otp=02347102

A second invocation, including removal from and re-insertion of the device to the RF field could then generate:

Static data: http://www.acme.com/?id=4711&otp=
OTP generated: 92184479
Static data presented http://www.acme.com/?id=4711&otp=92184479

Example 6

Deployment of Tickets

Assume the following scenario with a mass-transit company deploying access control devices comprising electronic tickets for use in commuter traffic. Such devices are typically bought by the end users in local shops at an "at cost" pricing. The important property of the present invention is to allow remote update and purchase of the device in a secure way, both from the end-user's perspective but also for the mass-transit company where fraud can cause financial losses.

Stage 1—Provisioning of a Device.

The issuer of the access control device personalizes the device with at least one cryptographic key in a secure environment. No other information except a device unique identity is stored in the device before being deployed to a user. The cryptographic key in this example is generated to be unique for each particular device. For the sake of this example, let's assume the cryptographic algorithm is AES-256.

Stage 2—Deployment to User and Association with a Service

The end-user purchases an access control device and then logs on to the issuer's site. The user links the device's unique identity by simply pressing an activation switch on the device. An OTP is generated, comprising the device unique identity. The issuer can then automatically associate a particular user with a particular symmetric cryptographic key, known to the issuer only.

Stage 3—"Charging" the Device with a Ticket or "Credits"

The user can now buy a ticket on-line and pay using traditional methods. The difference here is that the user can provide a strong identification- and authentication mechanism to make the purchases more secure. When the purchase is complete, the user gets a typical HTTP download dialog—"Do you want to download the file Ticket_2012_03_22.tkt ?". The user can then save this file to the MSD virtual file system or decide to save it on the local hard disk first. When the file is finally copied over to the device, the device decrypts and verifies the received Authenticated Encryption with Associated Data (AEAD) data. If the AEAD is valid, the decrypted ticket data is stored in the internal non-volatile key-credential storage of the device.

Assuming that for example AES-256-CCM is used for the AEAD generation, each ticket is keyed to a unique access control device by the means of its unique pre-configured identity data, the unique identity and a cryptographic key. This means that a ticket being intercepted or copied by someone else having a different access control device cannot successfully decrypt it. The AES-CCM nonce may further be used to key a device to a particular device identity and a ticket sequence number, generated by the issuer. With this approach, it can be guaranteed that two different tickets are never encrypted with the same nonce, thereby ensuring the integrity of AES-CCM.

Stage 4—Using the Key in a NFC Ecosystem

Assuming that at least one ticket has been "purchased" as described in stage 3 and has then been stored in a key-and credential storage of the device; the device can then be used "unplugged" like any RFID card.

Stage 5—Revocation of a Key and Handling of Refund

The access control device may optionally provide functionality to prematurely terminate a valid ticket and to securely provide refund for a purchase. A user can then delete a ticket stored on the device, using the normal file system's functions for delete. When the ticket has been deleted and then has been flagged as invalid, a "refund ticket" is generated. This refund ticket is valid in the context of identifying a revoked ticket only. If the user copies such a file and uploads it to the issuer, the issuer can decrypt this AEAD, using the same symmetrical key, to verify the cryptographic key's validity in the database. Assuming the key has not been used or if there is still credit left, the issuer can then issue a refund to the user. If the user has kept a copy of the original ticket and tries to copy that back to the device again, the operation will be rejected by the device itself.

The use of the device and method is not limited to mass-transit applications. Any credential-provisioning setting with requirements to secure credentials can benefit from this platform-independent and driver-less approach.

Example 7

An apparent example is physical access control, where users then can manage their own access rights. Assume a contract worker who is assigned a limited task in a certain area of a larger premise, even including access to certain computer systems. The worker then downloads the appropriate temporary rights, which are then downloaded using the standard operating system functionality directly to the access control device. When finished, the device is unplugged and is then ready to be used both as an RFID token in physical access as well as identification- and authentication when logging onto certain computer systems.

The access control devices which include an activation switch have the benefit that the user can have confidence in that the file system is not by default visible and is therefore inaccessible to viruses and Trojans possibly present in remote system.

Cryptographic operations can rely either on asymmetric- or symmetric encryption. The present invention allows for usage of symmetric encryption which in certain settings is advantageous. An asymmetric scheme would on the other hand allow a classic digital signature scheme, where received data is then verified using a public key rather than a shared key.

I claim:

1. An access control device having dual interfaces comprising:
    a contact-bound interface for communication with a remote system, the contact-bound interface comprising a USB interface with a USB type A plug and configured to receive access control credentials and cryptographic keys transmitted as files to the access control device; and
    a contact-less interface for communication with an access control system using an emulated RFID card;
    wherein the access control device further comprises a cryptographic processor, a virtual file system comprising a USB Mass Storage Device file system, a pre-configured unique identifier and a cryptographic key allowing for authentication and verification of access control credentials and cryptographic keys, the access control credentials and cryptographic keys stored in a storage upon acceptance, and being accessible to the emulated RFID card for transmission via the contact-less interface to the access control system; and
    wherein the files of access control credentials and cryptographic keys are handled as blocks of wrapped and/or Authenticated Encryption with Associated Data (AEAD) files.

2. The access control device in accordance with claim 1, wherein the blocks of AEAD files are encrypted by symmetric encryption.

3. The access control device in accordance with claim 1, wherein the blocks of AEAD files are encrypted by asymmetric encryption.

4. The access control device according to claim 1, wherein the access control device functions as a USB Human Interface Device (HID) responsive to the access control device being attached to a remote system via the contact-bound interface, the USB HID providing an activation switch for resetting the access control device to expose the USB Mass Storage Device file system.

5. The access control device according to claim 1, wherein the USB Mass Storage Device file system is removable media which by default is not mounted to a host computer and responsive to an explicit command of a holder of the device pressing an activation switch, the device sends a digital signal to the host computer, thereby causing the file system to be mounted and visible to the remote system.

6. The access control device in accordance with claim 1, wherein data derived from an access control credential and encryption key is transmitted over the contactless interface in the form of NFC Data Exchange Format (NDEF) records.

7. The access control device in accordance with claim 6, wherein the contactless interface is a Near Field Communication (NFC) interface.

8. A method for secure communication with an access control device comprising:
    receiving access control credentials and cryptographic keys transmitted as files to the access control device over a contact-bound interface, the contact-bound interface comprising a USB interface with a USB type A plug; and
    communicating data derived from an access control credential and cryptographic key to an access control system over a contact-less interface using an emulated RFID card;
    wherein the access control device comprises a cryptographic processor, a virtual file system comprising a USB Mass Storage Device file system, a pre-configured unique identifier and a cryptographic key allowing for authentication and verification of access control credentials and cryptographic keys, the access control credentials and cryptographic keys stored in a storage upon acceptance, and being accessible to the emulated RFID card for transmission via the contact-less interface to the access control system; and
    wherein the files of access control credentials and cryptographic keys are handled as blocks of wrapped and/or Authenticated Encryption with Associated Data (AEAD) files.

9. The method of claim 8, further comprising:
    encrypting the blocks of AEAD files by at least one of symmetric encryption and asymmetric encryption.

10. The method of claim 8, further comprising:
    providing USB Human Interface Device (HID) functions responsive to the access control device being attached to a remote system via the contact-bound interface, the USB HID providing an activation switch for resetting the access control device to expose the USB Mass Storage Device file system.

11. The method of claim 8, further comprising:
    responsive to an explicit command of a holder of the access control device pressing an activation switch, sending a digital signal to a host computer, thereby causing the USB Mass Storage Device file system of the access control device to be mounted and visible to the remote system, wherein the USB Mass Storage Device file system is removable media which by default is not mounted to the host computer.

12. The method of claim 8, further comprising:
    transmitting the data derived from an access control credential and cryptographic key over the contactless interface of the access control device in the form of NFC Data Exchange Format (NDEF) records.

13. The method of claim 12, wherein the contactless interface is a Near Field Communication (NFC) interface.

* * * * *